(12) United States Patent
Bortolussi et al.

(10) Patent No.: US 7,060,767 B2
(45) Date of Patent: Jun. 13, 2006

(54) SUPPORTED METALLOCENE CATALYTIC COMPONENT AND METHOD FOR OBTAINING SAME

(76) Inventors: Frédéric Bortolussi, 10, allée des Renardeaux, 94260 Fresnes (FR); Christophe Boisson, 155, rue Léon Blum, 69100 Villeurbanne (FR); Roger Spitz, 30, rue Jean Broquin, 69006 Lyons (FR); Jean Malinge, 3, chemin du Clos Chipier, 69230 St Genis Laval (FR); Jean-Pierre Broyer, 1C, rue Romain Rolland, 69500 Bron (FR)

( * ) Notice: Subject to any disclaimer, the term of this patent is extended or adjusted under 35 U.S.C. 154(b) by 6 days.

(21) Appl. No.: 10/476,152

(22) PCT Filed: Apr. 26, 2002

(86) PCT No.: PCT/FR02/01463

§ 371 (c)(1),
(2), (4) Date: Oct. 27, 2003

(87) PCT Pub. No.: WO02/088195

PCT Pub. Date: Nov. 7, 2002

(65) Prior Publication Data

US 2004/0147692 A1    Jul. 29, 2004

(30) Foreign Application Priority Data

Apr. 30, 2001  (FR) ................... 01 05805

(51) Int. Cl.
*C08F 4/16* (2006.01)
*C08F 4/52* (2006.01)
*C08F 4/44* (2006.01)
*C08F 4/58* (2006.01)

(52) U.S. Cl. .............. 526/160; 526/170; 526/126; 526/129; 526/130; 526/943

(58) Field of Classification Search ........... 526/170, 526/130, 160, 128, 134, 141, 943, 901, 941, 526/129; 502/103, 232
See application file for complete search history.

(56) References Cited

U.S. PATENT DOCUMENTS

| | | | | | |
|---|---|---|---|---|---|
| 4,147,664 A | * | 4/1979 | Pomogailo et al. | ......... | 502/122 |
| 4,361,497 A | * | 11/1982 | Boldt et al. | ................. | 502/159 |
| 5,202,398 A | * | 4/1993 | Antberg et al. | ............. | 526/129 |
| 5,312,938 A | | 5/1994 | Hefner et al. | ................. | 556/11 |
| 5,587,439 A | * | 12/1996 | DiMaio | ...................... | 526/142 |
| 5,824,620 A | | 10/1998 | Vega et al. | ................. | 502/117 |
| 5,846,895 A | | 12/1998 | Gila et al. | ................. | 502/107 |

FOREIGN PATENT DOCUMENTS

| | | | |
|---|---|---|---|
| EP | 0 206 794 | | 12/1986 |
| EP | 799 838 A1 | * | 10/1997 |
| EP | 0 821 009 | | 1/1998 |
| EP | 821 009 A1 | * | 1/1998 |
| EP | 0 839 836 | | 5/1998 |
| EP | 839 836 A1 | * | 5/1998 |
| FR | 2 824 066 | | 10/2002 |
| WO | WO 00/52063 A1 | * | 9/2000 |
| WO | WO 02/088195 | | 11/2002 |

OTHER PUBLICATIONS

Soga, Macromol. Symp. 1995, 89, 249-258.*
Merriam Webster's Collegiate Dictionary, 10th Ed., 1998, p. 1315.*

* cited by examiner

*Primary Examiner*—David W. Wu
*Assistant Examiner*—Rip A. Lee
(74) *Attorney, Agent, or Firm*—Smith, Gambrell & Russell, LLP

(57) ABSTRACT

The invention discloses a solid catalytic component comprising a metallocene, at least one first ligand of which comprises a cyclopentadienyl group chemically bonded via a methyl group to a support composed of a porous inorganic compound. It also discloses a process for the preparation of such a solid catalytic component.

Application to the polymerization and copolymerization of olefins.

18 Claims, No Drawings

SUPPORTED METALLOCENE CATALYTIC COMPONENT AND METHOD FOR OBTAINING SAME

FIELD OF THE INVENTION

The invention relates to novel metallocene catalysts, in particular for heterogeneous catalysis, and to their process of preparation.

The polymerization of olefins in the presence of catalysts of metallocene type has mainly been described in the homogeneous phase. In this type of polymerization, the catalyst, the olefin to be polymerized and the polyolefin synthesized are present in the same liquid phase, which generally involves a solvent.

However, these catalysts are not suited to heterogeneous-phase polymerization processes, such as suspension or gas-phase polymerization. These processes have a great many advantages, including in particular the production of a polymer in the form of a granule with a predetermined particle size distribution.

TECHNOLOGICAL BACKGROUND

Metallocene catalysts can be rendered heterogeneous by impregnation of a porous solid support with organometallic entities. Thus, EP 2 067 94 teaches the simultaneous or subsequent impregnation of a silica by an MAO and a metallocene. These compounds are then adsorbed on the support. However, the active entities are observed to easily desorb from the support during their use. Catalysts of this type then lead to problems of fouling of the polymerization reactors. In addition, a nonhomogeneous polymerization result is observed. To overcome this disadvantage, one solution consists in chemically grafting the organometallic entity to the support.

Several routes are possible in obtaining this type of catalyst.

One route consists of the unit construction on an inorganic support: the catalyst is constructed stage by stage on a support. Grafting to the support is carried out either via cene ligands or via a substituent of the bridge of the metallocene complex.

Thus, Soga et al. describe (*Macromol. Symp.*, 1995, 89, 249–258) a process comprising a heat treatment and then the chemical modification of the silica to introduce an intermediate group. The attachment of the cene ligands is subsequently carried out via their lithiated equivalents. These catalysts are unfortunately not very active. Furthermore, the nature of the active sites obtained is not well defined. It would appear that two types of entities grafted to the silica coexist: a monobridged entity and a bibridged entity, rigidly bonded to the support.

EP 0 821 009 provides for the construction of a metallocene on a support treated with butyllithium by the intermediate composed of an ethyl cyclopentadienyl as anchoring chain.

Patent U.S. Pat. No. 5,846,895, discloses the synthesis of catalysts having a ligand grafted to the support via a substituent of the ligand, the second ligand being "free" with regard to the surface. The cyclopentadienyl (Cp) ligand is always bonded to the silane before being grafted to the support. However, the activity of the catalyst remains far below that of the equivalent homogeneous catalyst.

A second route consists in grafting a presynthesized catalyst: a metallocene catalyst, already synthesized, is reacted with an inorganic support via a substituent present on one of its cene ligands. The grafting is carried out in a single stage.

This route has a number of advantages, including that of good definition of the structure of the metallocene. The support is generally treated chemically beforehand in order to increase its reactivity with respect to the substituent of the cene ligand, which will make it possible to increase the efficiency of the grafting. Also, although this process comprises only one stage, it remains necessary to carry out numerous stages of synthesis and of purification of the presynthesized catalyst. Finally, there is a risk of obtaining several different entities, resulting from the reaction of different sites of the presynthesized catalyst with the support. Patents U.S. Pat. Nos. 5,202,398 and 5,824,620 disclose a supported catalyst obtained by direct reaction of a functionalized metallocene with the support. A catalytic system obtained by heterogenization of a metallocene by an —OSiR$_3$ group on a support is also disclosed in EP 0 839 836. However, this approach exhibits the disadvantage of requiring the synthesis beforehand of the functionalized metallocene and of reducing the versatility of the synthesis of catalysts for the various requirements of the polyolefin industry.

Finally, the unit construction on an organic support constitutes a third route for producing solid catalytic components: the synthesis of the catalyst is carried out either on a polymer which has already been synthesized, for example polystyrene, or on a polysiloxane which comprises cene ligands.

However, and whatever the methods employed, catalysts of low activity are generally obtained.

SUMMARY OF THE INVENTION

The aim of the invention is to provide a solid catalytic component of metallocene type which does not exhibit the disadvantages described above and which in particular has a high activity.

A first subject matter of the invention is a solid catalytic component of metallocene type comprising a cyclopentadienyl group chemically bonded via a methyl group to a support composed of a porous inorganic compound.

According to a preferred embodiment, the porous inorganic compound is a silica.

According to another embodiment, the metallocene comprises a metal chosen from titanium, vanadium, hafnium, zirconium and chromium, preferably zirconium.

According to yet another embodiment, the methyl group chemically bonding the first ligand comprising a cyclopentadienyl group to the support is substituted by two methyl or phenyl groups.

Preferably, the metallocene additionally comprises a second ligand.

According to one embodiment, this second ligand comprises a cyclopentadiene group.

According to another embodiment, the second ligand comprises a substituted or unsubstituted amide group or an alkoxide group.

According to one embodiment, the first ligand and the second ligand are bonded to one another via a bridging group.

Preferably, the bridging group is a dimethylsilane group.

Another object of the invention relates to a process for the preparation of a metallocene chemically bonded to a solid, which comprises the stages of:

(a) provision of a support comprising functional groups capable of reacting with a fulvene compound;
(b) reaction with a fulvene compound according to the formula (1)

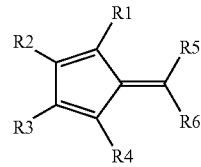

(1)

in which R1 to R6 can be a hydrogen atom or identical or different $C_1$ to $C_{16}$ alkyl, alkenyl, aryl, alkylaryl or arylalkyl radicals which can form one or more saturated or unsaturated rings;

(c) for the production of a cyclopentadienyl derivative bonded to the solid support via a methyl bridge, reaction of the product obtained in stage (c) with a transition metal compound according to the formula $ML_x$, in which M is a transition metal chosen from the elements from Groups 3, 4, 5, 6, 7, 8, 9 and of the Periodic Table of the Elements and the lanthanides, L is a halogen, a hydrogen, an alkyl, an aryl, an alkoxy or an amide, and x is an integer corresponding to the valency of the metal M.

According to one embodiment, the process additionally comprises the stage of:

(d) reaction of the product from stage (c) with a compound according to the formula (4):

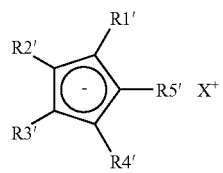

(4)

in which R1' to R5' represent a hydrogen atom or identical or different $C_1$ to $C_{16}$ alkyl, alkenyl, aryl, alkylaryl or arylalkyl groups which can form one or more saturated or unsaturated rings and X is an alkali metal.

According to another embodiment, the process additionally comprises the stage of activation of the product from stage (d) with a cocatalyst.

The cocatalyst is preferably chosen from methylalumiumoxane or the $B(C_6F_5)_3$/triisobutylaluminum and [HNMe$_2$Ph][B(C$_6$F$_5$)$_4$]/triisobutylaluminum systems.

According to one embodiment, before stage (c), the product from stage (b) is reacted with a compound carrying a difunctional group and then the product thus obtained is subjected to deprotonation.

According to a preferred embodiment, the compound carrying a bridging group A corresponds to the of formula (6):

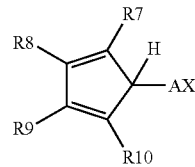

(6)

in which A is a difunctional group, X is a halogen and R7 to R10 represent a hydrogen atom or identical or different $C_1$ to $C_{16}$ alkyl, alkenyl, aryl, alkylaryl or arylalkyl groups which can form one or more saturated or unsaturated rings.

Another subject matter of the invention is a solid catalytic component capable of being obtained by this process.

Finally, a subject matter of the invention is a process for the suspension or gas-phase polymerization or copolymerization of at least one olefin in the presence of the catalytic component according to the invention.

The solid catalytic component according to the invention exhibits a high activity in the polymerization or copolymerization of at least one olefin, such as ethylene or propylene. The solid catalytic component according to the invention can result in polymers or copolymers with a high molar mass, for example with a weight-average molar mass of greater than 100 000, and possessing a low poly-dispersity, for example of less than 2.5.

DETAILED DESCRIPTION OF THE INVENTION

The components of solid catalysts according to the invention are obtained according to the following preparation process.

1st stage

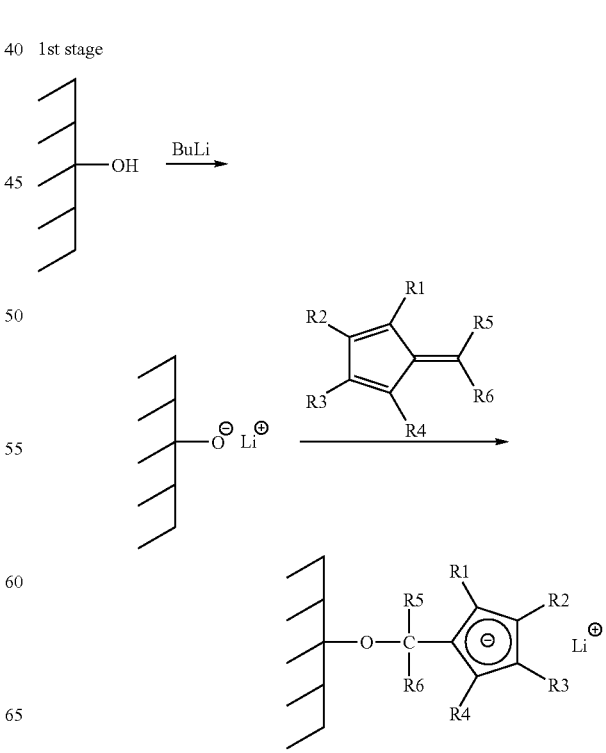

2nd stage

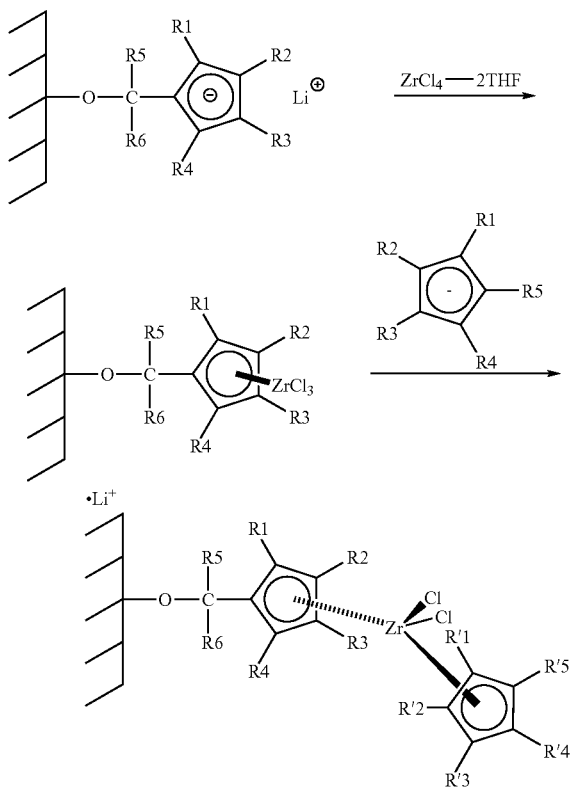
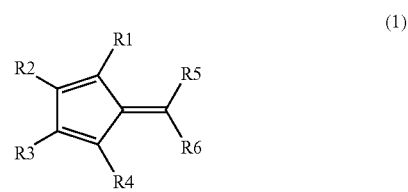

Scheme 1: Preparation Process According to a Preferred Embodiment

1st Stage: Chemical Grafting of a Ligand with a Cyclopentadienyl Structure to the Solid Support The support used for the preparation of the solid catalytic component according to the invention is finely divided and exhibits functional groups having a high reactivity with respect to the reactants employed. An inorganic support carrying hydroxyl functional groups is preferably chosen. Mention may be made, among the latter, of inorganic oxides, such as alumina, silica or their mixtures.

The support preferably comprises pores with a diameter ranging from 7.5 to 30 nm. Its porosity is preferably from 1 to 4 cm$^3$/g. The support advantageously exhibits a [lacuna] surface ranging from 100 to 600 m$^2$/g. The support generally exhibits a mean particle size diameter ranging from 10 to 100 μm. The support preferably exhibits, at its surface, from 0.5 to 10 and more preferably 1 to 8 hydroxyl groups per nm$^2$.

This support can have various natures. Depending on its nature, its state of hydration and its ability to retain water, there may be reason to subject it to dehydration treatments until the desired content of hydroxyl groups at the surface is obtained. For example, if the support is a silica, the silica can be heated at between 100 and 1000° C. and preferably between 140 and 800° C. while flushing with an inert gas, such as nitrogen or argon, at atmospheric pressure or preferably under vacuum, for example absolute pressure $1 \times 10^{-2}$ mbar, for, for example, at least 60 minutes. For this heat treatment, the silica can be mixed, for example, with NH$_4$Cl so as to accelerate the dehydration.

In addition, the support is preferably activated before it is used. In the case where it is a support comprising hydroxyl functional groups, the activation can be carried out, for example, by reaction with an alkyllithium compound RX where X=Li$^+$ and R is an alkyl group. Preferably, R is a C$_2$ to C$_6$ alkyl, even more preferred R is butyl.

If appropriate after a preliminary activation treatment on the support, chemical grafting to the support is carried out by reaction of the reactive functional group with a substituted fulvene according to the formula (1),

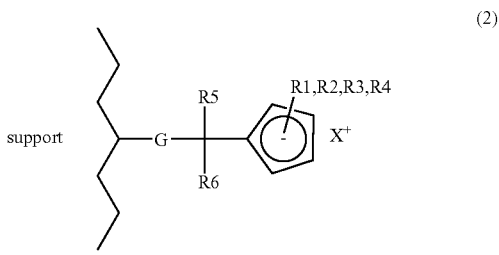

in which R1 to R6 can be a hydrogen atom or identical or different C$_1$ to C$_{16}$ alkyl, alkenyl, aryl, alkylaryl or arylalkyl radicals which can form one or more saturated or unsaturated rings. Advantageously, R5 and R6 are methyl or phenyl.

The activated support is preferably suspended in an inert solvent, such as chosen from aliphatic hydrocarbons, for example hexane or heptane, aromatic hydrocarbons, for example benzene, toluene, xylene, cumene or cymene, alicyclic hydrocarbons, for example cyclopentane, cyclooctane, methylcyclopentane or methylcyclohexane, or ethers, for example diethyl ether or tetrahydrofuran, under an atmosphere of inert gas, for example nitrogen or argon. The fulvene derivative (1) is added in an amount of between 0.01 and 100 and preferably ranges from 0.5 to 2. The suspension obtained is then stirred at a temperature of between ambient temperature and the boiling point of the solvent used, preferably at a temperature of between 40 and 110° C.

A cyclopentadienyl derivative grafted to the support via a —[C(R5,R6)]—bridge according to the formula (2):

$$\text{(2)}$$

in which G is the reactive functional group of the support, preferably a deprotonated hydroxyl, X is an alkali metal, preferably lithium, and R1 to R6 have the same meaning as in the formula (1), is then obtained.

2nd Stage: Generation of the Organometallic Entity Chemically Bonded to the Surface An unbridged compound (5) is obtained according to a route a, whereas the route b gives access to the bridged compound (5').

Route a

A transition metal derivative $ML_x$ reacts with the modified support (2). The product obtained has a structure according to the formula (3):

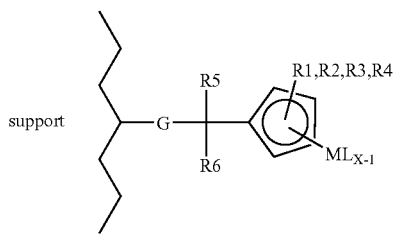
(3)

in which M is a transition metal chosen from the elements from Groups 3, 4, 5, 6, 7, 8, 9 and 10 and the lanthanides of the Periodic Table of the Elements, preferably chosen from titanium, vanadium, hafnium, zirconium and chromium; L is a halogen, a hydrogen, an alkyl, an aryl, an alkoxy or an amide; x is an integer corresponding to the valency of the metal M; and R1 to R6 have the same meaning as in the formula (1).

Mention may be made, as examples of transition metal derivatives, of $TiCl_4$, $TiBr_4$, $TiI_4$, $ZrCl_4$, $ZrBr_4$, $ZrI_4$, $HfCl_4$, $HfBr_4$, $HfI_4$, $VCl_4$, $NbCl_5$, $TaCl_5$, $MoCl_5$, $WCl_5$ or $NdCl_3$. The transition metal derivative can also be a complex between one of the compounds described and an electron-donating compound, such as tetrahydrofuran.

In carrying out the stage, use is preferably made of an inert solvent which can, for example, be chosen from aliphatic hydrocarbons, such as hexane or heptane, aromatic hydrocarbons, such as benzene, toluene, xylene, cumene or cymene, alicyclic hydrocarbons, such as cyclopentane, cyclooctane, methylcyclopentane or methylcyclohexane, or ethers, such as diethyl ether or tetrahydrofuran, under an atmosphere of an inert gas, such as nitrogen or argon.

The molar ratio of the halogenated derivative to the surface hydroxyl groups of the support is generally between 0.5 and 30 and preferably ranges from 1 to 20. Use is preferably made of 5 to 100 ml and more preferably of 10 to 50 ml of inert solvent per gram of support. This contacting operation can be carried out between 80 and 150° C., with stirring, if appropriate under pressure, if the nature of the solvent requires it. On conclusion of the reaction, it is advisable to wash the solid with an inert solvent of the type of those proposed for carrying out this stage. The solid can subsequently be recovered by siphoning or filtration.

The compound (3) can subsequently be reacted with a compound according to the formula (4):

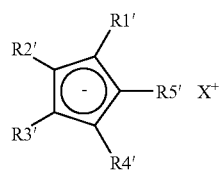
(4)

in which R1' to R5' represent a hydrogen atom or identical or different $C_1$ to $C_{16}$ alkyl, alkenyl, aryl, alkylaryl or arylalkyl groups which can form one or more saturated or unsaturated rings and X is an alkali metal, preferably lithium. The derivative (4) is preferably a cyclopentadienyl, an indenyl or a fluorenyl which is or is not substituted and which is optionally hydrogenated, such as tetrahydroindenyl or octahydrofluorenyl.

The precatalyst (5) obtained following the reaction of (3) and (4) has the following general formula:

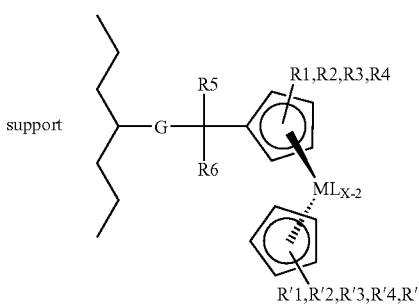
(5)

Route b:

The compound (2) is reacted with a ligand carrying a bridging group A. The ligand can be a cyclopentadienyl group but also any other compound capable of acting as ligand, for example $NR_2$, NHR or OR, that is to say amide or alkoxide. Preferably, the ligand is a compound according to the formula (6):

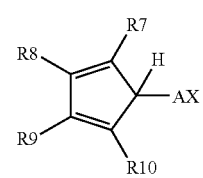
(6)

in which A is a difunctional group, such as $Si(CH_3)_2$, $SiPh_2$ or $CH_2CH_2$; X is a halogen; and R7 to R10 can be a hydrogen atom or identical or different $C_1$ to $C_{16}$ alkyl, alkenyl, aryl, alkylaryl or arylalkyl radicals which can form one or more saturated or unsaturated rings. According to a preferred embodiment of the invention, (6) is fluorenylSi$(CH_3)_2$Cl.

The reaction between the compound (2) and the ligand (6) results in the compound according to the formula (7):

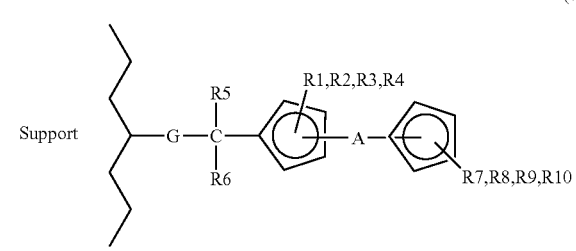
(7)

The compound (7) is converted to the precatalyst (5'), the carrier of a bridged ligand, by deprotonation of the ligands followed by metallation by $ML_x$.

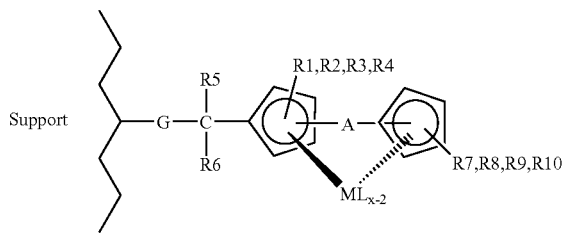

(5')

3rd Stage: Activation of the Precatalyst (5) or (5'):

The heterogeneous precatalysts (5) or (5') are preferably activated by the usual cocatalysts for catalysts of monosite type (in particular perfluorinated boranes of $B(C_6F_5)_3$ type and borates of $[X][B(C_6F_5)_4]$ type with preferably $X=CPh_3$ or $HNMe_2Ph$) after alkylation of the derivative (5) or (5') or MAO).

The solid catalytic components according to the invention then constitute heterogeneous catalytic components compatible with heterogeneous-phase polymerization processes. The organometallic entities are chemically bonded thereto at the surface of a solid support, which makes it possible to avoid the phenomena of desorption of catalytic entities during the subsequent processing stages of the component: activation, polymerization. The component is heterogeneous and therefore compatible with heterogeneous polymerization processes; in particular, the gas-phase process is very active in the polymerization of olefins.

In comparison with the studies by Soga et al. (*Macromol. Symp.*, 1995, 89, 249–258), to give an example of unit construction, the grafting as described makes it possible to avoid the stage of deprotonation of the ligands of the cyclopentadienyl type chemically bonded to the surface. This stage may be incomplete and/or may give rise to secondary reactions, such as detachment of the grafted entities or opening of siloxane bridges on the support.

Furthermore, the method described exhibits, in comparison with the grafting of a presynthesized catalyst, the advantage of being easily generalized to a large number of structures. In addition, it does not require the problematic synthesis of molecular complexes. In other words, the ease and the reduced number of the synthetic stages may be emphasized. The syntheses disclosed in EP 0 821 009, as in the article in Macromolecules (2000, 333, 3194), do not make possible access to complexes having a single carbon between the support and the cyclopentadienyl ligand.

The invention will be described in more detail by means of the following examples, which are given by way of illustration and without implied limitation.

EXAMPLES

The handling operations are carried out under argon with conventional Schlenk techniques. The heptane and the toluene used as solvents are dried over 3 Å molecular sieve. The THF used as solvent and reactant is dried over sodium/benzophenone.

Silicas Used

|  | Silica | | |
|---|---|---|---|
|  | A | B | C |
| Name | Grace 322, postactivated | Grace 322 | Sylopol |
| Mean particle size (μm) | 20–45 | 35–70 | 56 |
| Pore volume (ml/g) | 1.55 | 1.55 | 1.54 |
| Mean specific surface (m²/g) | 320 | 320 | 284 |

Heat Treatment of the Silicas

Whatever the type of silica used, 6 g of this support is subjected to a heat treatment under vacuum which successively comprises a rise in temperature from 20° C. to 100° C. over thirty minutes, from 100° C. to 130° C. over thirty minutes and from 130° C. to 550° C. over one hour thirty minutes, a stationary phase of 5 hours at 550° C. and a descent to ambient temperature. Following this treatment, the levels of hydroxyl groups at the surface of the various silicas are as follows:

|  | Silica A | Silica B | Silica C |
|---|---|---|---|
| Surface hydroxyl groups (mmol of OH/g of silica) | 1.1 | 1.1 | 0.7 |

Preparation of Silica D 1.9 ml of a 0.9M solution of tributylaluminum in heptane (1.7 mmol) are introduced, at ambient temperature, into a 150 ml Schlenk flask comprising 0.333 g of said thermally treated silica A (i.e. 0.36 mmol of hydroxyl groups) in suspension in 50 ml of toluene. The suspension is stirred at ambient temperature for 4 hours. The support is washed with 3 times 40 ml of toluene and dried at ambient temperature under vacuum.

Preparation of the Catalysts

Preparation of the Starting Stock S 1.52 ml of a 1.6M solution of BuLi in heptane (2.4 mmol) are introduced, at ambient temperature, into a 150 ml Schlenk flask comprising 2.209 g of said thermally treated silica A (2.4 mmol of hydroxyl groups) in suspension in 50 ml of toluene. The suspension is stirred at ambient temperature for 4 hours. The support is washed with 3 times 40 ml of toluene and dried at ambient temperature under vacuum. The solid recovered is suspended in 50 ml of freshly distilled THF. 0.29 ml of 6,6-dimethylfulvene (2.4 mmol) is subsequently introduced therein at ambient temperature and under an argon atmosphere. The suspension is stirred at 60° C. for 24 hours. During the reaction, the support assumes an orangey coloring. After returning to ambient temperature, the support is washed with three times 40 ml of freshly distilled THF and dried at ambient temperature under vacuum. An orangey solid is then recovered.

Preparation of Catalyst A 1.07 ml of freshly distilled THF (1.3 mmol) are introduced, at ambient temperature, into a 100 ml Schlenk flask comprising 1.546 g of zirconium tetrachloride (6.6 mmol) in suspension in 50 ml of toluene. The solution comprising the $ZrCl_4.2THF$ complex is introduced at 100° C. into a 150 ml Schlenk flask comprising 1.115 g of starting stock S (1.2 mmol of hydroxyl groups) suspended in 20 ml of toluene at 100° C. The mixture obtained is brought to reflux for 24 hours. After returning to 100° C., the support is washed with three times 40 ml of toluene. The support is brought back to ambient temperature before being dried under vacuum. The support, which then has a brown coloring, is suspended in 20 ml of toluene. A solution comprising 0.086 g of cyclopentadienyllithium (1.2 mmol) suspended in 30 ml of toluene is subsequently introduced therein at ambient temperature. The mixture is brought to reflux after 24 hours. Before being brought back to ambient temperature, the catalyst is washed with three times 40 ml of toluene at 100° C. The catalyst is subsequently dried under vacuum. Elemental analysis of this catalyst gives us a level of zirconium equal to 7.4% by weight (0.811 mmol/g).

Preparation of Catalyst B

Catalyst B is prepared in the same way as catalyst A, except that, in this case, the silica used corresponds to said thermally treated silica B. The amounts introduced for the synthesis are as follows: 0.996 g of said silica B (1.1 mmol of hydroxyl groups), 0.66 ml of the 1.6M solution of BuLi in heptane (1.1 mmol), 0.13 ml of 6,6-dimethylfulvene (1.1 mmol), 1.190 g of $ZrCl_4$ (5.1 mmol), 0.83 ml of freshly distilled THF (10.2 mmol) and 0.078 g of LiCp (1.1 mmol).

Elemental analysis of this catalyst gives us a level of zirconium equal to 7.0% by weight (0.767 mmol/g).

Preparation of Catalyst C

Catalyst C is prepared in the same way as catalyst A except that, in this case, 0.777 g (0.85 mmol of hydroxyl groups) of starting stock S is withdrawn. The amounts introduced for the synthesis are as follows: 1.353 g of $ZrCl_4$ (5.8 mmol), 0.94 ml of freshly distilled THF (11.6 mmol) and 0.020 g of LiCp (0.3 mmol).

Elemental analysis of this catalyst gives us a level of zirconium equal to 9.1% by weight (1.003 mmol/g).

Preparation of Catalyst D 0.56 ml of a 1.6M solution of BuLi in heptane (0.9 mmol) is introduced, at ambient temperature, into a 150 ml Schlenk flask comprising 1.287 g of said thermally treated silica C (0.9 mmol of hydroxyl groups) in suspension in 50 ml of toluene. The suspension is stirred at ambient temperature for 4 hours. The support is washed with 3 times 40 ml of toluene and then the solvent is evaporated under a stream of argon. The solid recovered is suspended in 50 ml of toluene. 0.13 ml of 6,6-dimethylfulvene (1.0 mmol) is subsequently introduced therein at ambient temperature and under an argon atmosphere. The suspension is stirred at ambient temperature for 30 minutes and then at reflux for 2 hours. During the reaction, the support assumes an orangey coloration. After returning to ambient temperature, the support is washed with three times 40 ml of toluene and then washed with three times 40 ml of heptane. The solvent is subsequently evaporated by flushing with argon. An orangey solid is then recovered. This solid is suspended in 20 ml of toluene. 0.72 ml of freshly distilled THF (i.e. 8.8 mmol) is introduced, at ambient temperature, into a 100 ml Schlenk flask comprising 1.040 g of zirconium tetrachloride (4.4 mmol) in suspension in 50 ml of toluene. The solution comprising the $ZrCl_4$.2THF complex is introduced at 100° C. into the Schlenk flask comprising the support. The mixture obtained is brought to reflux for 24 hours. After returning to 100° C., the support is washed with three times 40 ml of toluene. The support is brought back to ambient temperature and then the solvent is evaporated by flushing with argon. The support, which then has a brown coloration, is suspended in 20 ml of toluene. A solution comprising 0.061 g of cyclopentadienyllithium (0.8 mmol) suspended in 30 ml of toluene is subsequently introduced therein at ambient temperature. The mixture is brought to reflux after 24 hours. Before being brought back to ambient temperature, the catalyst is washed with three times 40 ml of toluene at 100° C. The solvent is subsequently evaporated by flushing with argon. Elemental analysis of the catalyst obtained gives us a level of zirconium equal to 6.9% by weight (0.757 mmol/g).

Preparation of Catalyst E 0.3 ml of a 1.6M solution of BuLi in heptane (0.5 mmol) is introduced, at ambient temperature, into a 150 ml Schlenk flask comprising 0.680 g of said thermally treated silica C (0.5 mmol of hydroxyl groups) in suspension in 50 ml of toluene. The suspension is stirred at ambient temperature for 4 hours. The support is washed with 3 times 40 ml of toluene and then the solvent is evaporated under a stream of argon. The solid recovered is suspended in 50 ml of toluene, to which 0.05 ml of chlorotrimethylsilane (0.4 mmol) is added at ambient temperature and under an argon atmosphere. The mixture obtained is brought to reflux for 48 hours. After returning to 80° C., the support is washed with three times 40 ml of toluene. The support is brought back to ambient temperature and then the solvent is evaporated under a stream of argon. The solid recovered is suspended in 50 ml of toluene. 0.05 ml of 6,6-dimethylfulvene (0.5 mmol) is subsequently introduced therein at ambient temperature and under an argon atmosphere. The suspension is stirred at ambient temperature for 30 minutes and then at reflux for 24 hours. During the reaction, the support assumes an orangey coloration. After returning to 100° C., the support is washed with three times 40 ml of toluene. The solvent is subsequently evaporated by flushing with argon. An orangey solid is then recovered. This solid is suspended in 20 ml of toluene. 0.41 ml of freshly distilled THF (5.0 mmol) is introduced, at ambient temperature, into a 100 ml Schlenk flask comprising 0.594 g of zirconium tetrachloride (2.5 mmol) in suspension in 50 ml of toluene. The solution comprising the $ZrCl_4$.2THF complex is introduced at ambient temperature into the Schlenk flask comprising the support. The mixture obtained is brought to reflux for 24 hours. After returning to 100° C., the support is washed with three times 40 ml of toluene. The support is brought back to ambient temperature and then the solvent is evaporated under a stream of argon. The support, which then has a brown coloration, is suspended in 20 ml of toluene. A solution comprising 0.0160 g of cyclopentadienyllithium (0.2 mmol) suspended in 30 ml of toluene is subsequently introduced therein at ambient temperature. The mixture is brought to reflux for 24 hours. Before being brought back to ambient temperature, the catalyst is washed with three times 40 ml of toluene at 100° C. and then the solvent is evaporated under a stream of argon.

Elemental analysis of the catalyst obtained gives us a level of zirconium equal to 3.4% by weight (0.373 mmol/g).

Preparation of Catalyst F 0.191 g of silica D is introduced into a 50 ml Schlenk flask comprising 0.046 g of catalyst A. A solid/solid dilution is thus obtained comprising 20% of catalyst A in silica D.

Preparation of Catalyst G 0.095 g of silica D is introduced into a 50 ml Schlenk flask comprising 0.027 g of catalyst D. A solid/solid dilution is thus obtained comprising 22% of catalyst D in silica D.

Polymerizations

Example 1

1.96 ml of a 1.53M solution of methylaluminoxane in toluene (2.9 mmol) and then 0.006 g of catalyst A (4.8 µmol of Zr) are introduced into a 500 ml two-necked round-bottomed flask comprising 300 ml of heptane. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 40 minutes, the reactor is degassed and the polymer is precipitated from a dilute solution of acidic methanol (MeOH/HCl). After filtering, washing with methanol and drying, 17.8 g of polyethylene are recovered, which corresponds to a productive output of 2 966 g PE/g catalyst. The melt flow index of the polymer, at 190° C. under 21.6 kg, is 6.2 g/10 minutes.

Example 2

2.5 ml of a 0.9M solution of tributylaluminum in heptane (2.2 mmol) and then 0.028 g of catalyst A (i.e. 22.7 µmol of Zr) are introduced into a 500 ml two-necked round-bottomed flask comprising 300 ml of heptane. 7.9 ml of a 3.1 mM solution of tris(pentafluorophenyl)borane in petroleum ether (24.5 µmol) are subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 4 hours, the reactor is degassed and the polymer is precipitated from a dilute solution of acidic methanol (MeOH/HCl). After filtering, washing with methanol and drying, 4.0 g of polyethylene are recovered, which corresponds to a productive output of 143 g PE/g catalyst.

Example 3

0.45 ml of a 0.9M solution of tributylaluminum in heptane (0.4 mmol) and then 0.005 g of catalyst A (i.e. 4.1 µmol of Zr) are introduced into a 500 ml two-necked round-bottomed flask comprising 300 ml of heptane. 0.005 g of N,N-dimethylaluminum tetra(pentafluorophenyl)borate (i.e. 6.2 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 1 hour, the reactor is degassed and the polymer is precipitated from a dilute solution of acidic methanol (MeOH/HCl). After filtering, washing with methanol and drying, 17.9 g of polyethylene are recovered, which corresponds to a productive output of 3 580 g PE/g catalyst. The melt flow index of the polymer, at 190° C. under 21.6 kg, is 10.2 g/10 minutes.

Example 4

0.1 ml of a 0.9M solution of tributylaluminum in heptane (0.11 mmol) and then 0.006 g of catalyst F (i.e. 1.2 mg of catalyst A, i.e. 1.0 µmol of Zr) are introduced into a 500 ml two-necked round-bottomed flask comprising 300 ml of heptane. 0.001 g of N,N-dimethylaluminum tetra(pentafluorophenyl)borate (i.e. 1.2 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 12 minutes, the reactor is degassed and the polymer is precipitated from a dilute solution of acidic methanol (MeOH/HCl). After filtering, washing with methanol and drying, 4.4 g of polyethylene are recovered, which corresponds to a productive output of 3 384 g PE/g catalyst A. The melt flow index of the polymer, at 190° C. under 21.6 kg, is 0.8 g/10 minutes.

Example 5

1.96 ml of a 1.53M solution of methylaluminoxane in toluene (2.9 mmol) and then 0.005 g of catalyst B (3.8 µmol of Zr) are introduced into a 500 ml two-necked round-bottomed flask comprising 300 ml of heptane. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 20 minutes, the reactor is degassed and the polymer is precipitated from a dilute solution of acidic methanol (MeOH/HCl). After filtering, washing with methanol and drying, 9.5 g of polyethylene are recovered, which corresponds to a productive output of 1 900 g PE/g catalyst.

Example 6

1.96 ml of a 1.53M solution of methylaluminoxane in toluene (2.9 mmol) and then 0.007 g of catalyst C (7.0 µmol of Zr) are introduced into a 500 ml two-necked round-bottomed flask comprising 300 ml of heptane. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 30 minutes, the reactor is degassed and the polymer is precipitated from a dilute solution of acidic methanol (MeOH/HCl). After filtering, washing with methanol and drying, 2.8 g of polyethylene are recovered, which corresponds to a productive output of 400 g PE/g catalyst.

Example 7

0.3 ml of a 1.3M solution of tributylaluminum in heptane (0.4 mmol) and then 0.005 g of catalyst D (3.8 µmol of Zr) are introduced into a 500 ml two-necked round-bottomed flask comprising 300 ml of heptane. 0.006 g of N,N-dimethylaluminum tetra(pentafluorophenyl)borate (7.5 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 5 minutes, the reactor is degassed and the polymer is precipitated from a dilute solution of acidic methanol (MeOH/HCl). After filtering, washing with methanol and drying, 5.5 g of polyethylene are recovered, which corresponds to a productive output of 1 100 g PE/g catalyst. The melt flow index of the polymer, at 190° C. under 2.16 kg, is 0.1 g/10 minutes.

Example 8

0.42 ml of a 1.3M solution of tributylaluminum in heptane (0.5 mmol) and then 0.007 g of catalyst D (5.3 µmol of Zr) are introduced into a 500 ml two-necked round-bottomed flask comprising 300 ml of heptane. 0.006 g of N,N- dimethylaluminum tetra(pentafluorophenyl)borate (7.5 µmol) is subsequently introduced. The suspension thus obtained is introduced under a stream of argon into a 0.5 liter glass reactor. After having degassed the reactor, the pressure is raised to 4 bar absolute of an ethylene/hydrogen mixture ($C_2/H_2$ molar ratio=1/10 000) and the temperature is raised to 80° C. The pressure and the temperature are kept constant during the polymerization. After polymerizing for 10 minutes, the [lacuna] is degassed and the polymer is precipitated from a dilute solution of acidic methanol (MeOH/HCl). After filtering, washing with methanol and drying, 6.8 g of polyethylene are recovered, which corresponds to a productive output of 971 g PE/g catalyst. The melt flow index of the polymer, at 190° C. under 2.16 kg, is 0.8 g/10 minutes.

Example 9

0.47 ml of a 1.3M solution of tributylaluminum in heptane (0.6 mmol) and then 0.008 g of catalyst D (6.1 µmol of Zr) are introduced into a 500 ml two-necked round-bottomed flask comprising 300 ml of heptane. 0.008 g of N,N-dimethylaluminum tetra(pentafluorophenyl)borate (9.9 µmol) is subsequently introduced. The suspension thus obtained is introduced under a stream of argon into a 0.5 liter glass reactor. After having degassed the reactor, the pressure is raised to 4 bar absolute of an ethylene/hydrogen mixture ($C_2/H_2$ molar ratio=2/10 000) and the temperature is raised to 80° C. The pressure and the temperature are kept constant during the polymerization. After polymerizing for 7 minutes, the [lacuna] is degassed and the polymer is precipitated from a dilute solution of acidic methanol (MeOH/HCl). After filtering, washing with methanol and drying, 6.5 g of polyethylene are recovered, which corresponds to a productive output of 812 g PE/g catalyst. The melt flow index of the polymer, at 190° C. under 2.16 kg, is 1.5 g/10 minutes.

Example 10

0.47 ml of a 1.3M solution of tributylaluminum in heptane (0.6 mmol) and then 0.008 g of catalyst D (6.1 µmol of Zr) are introduced into a 500 ml two-necked round-bottomed flask comprising 300 ml of heptane. 0.005 g of N,N-dimethylaluminum tetra(pentafluorophenyl)borate (6.2 µmol) is subsequently introduced. The suspension thus obtained is introduced under a stream of argon into a 0.5 liter glass reactor. After having degassed the reactor, the pressure is raised to 4 bar absolute of an ethylene/hydrogen mixture ($C_2/H_2$ molar ratio=3/10 000) and the temperature is raised to 80° C. The pressure and the temperature are kept constant during the polymerization. After polymerizing for 12 minutes, the reactor is degassed and the polymer is precipitated from a dilute solution of acidic methanol (MeOH/HCl). After filtering, washing with methanol and drying, 7.1 g of polyethylene are recovered, which corresponds to a productive output of 887 g PE/g catalyst. The melt flow index of the polymer, at 190° C. under 2.16 kg, is 1.2 g/10 minutes.

Example 11

0.42 ml of a 1.3M solution of tributylaluminum in heptane (0.5 mmol) and then 0.007 g of catalyst D (5.3 µmol of Zr) are introduced into a 500 ml two-necked round-bottomed flask comprising 300 ml of heptane. 0.007 g of N,N-dimethylaluminum tetra(pentafluorophenyl)borate (8.7 µmol) is subsequently introduced. The suspension thus obtained is introduced under a stream of argon into a 0.5 liter glass reactor. After having degassed the reactor, the pressure is raised to 4 bar absolute of an ethylene/hydrogen mixture ($C_2/H_2$ molar ratio=4/10 000) and the temperature is raised to 80° C. The pressure and the temperature are kept constant during the polymerization. After polymerizing for 15 minutes, the reactor is degassed and the polymer is precipitated from a dilute solution of acidic methanol (MeOH/HCl). After filtering, washing with methanol and drying, 6.9 g of polyethylene are recovered, which corresponds to a productive output of 985 g PE/g catalyst. The melt flow index of the polymer, at 190° C. under 2.16 kg, is 1.5 g/10 minutes.

Example 12

0.42 ml of a 1.3M solution of tributylaluminum in heptane (0.5 mmol) and then 0.007 g of catalyst D (5.3 µmol of Zr) are introduced into a 500 ml two-necked round-bottomed flask comprising 300 ml of heptane. 0.005 g of N,N-dimethylaluminum tetra(pentafluorophenyl)borate (6.2 µmol) is subsequently introduced. The suspension thus obtained is introduced under a stream of argon into a 0.5 liter glass reactor. After having degassed the reactor, the pressure is raised to 4 bar absolute of an ethylene/hydrogen mixture ($C_2/H_2$ molar ratio=5/10 000) and the temperature is raised to 80° C. The pressure and the temperature are kept constant during the polymerization. After polymerizing for 15 minutes, the reactor is degassed and the polymer is precipitated from a dilute solution of acidic methanol (MeOH/HCl). After filtering, washing with methanol and drying, 5.7 g of polyethylene are recovered, which corresponds to a productive output of 814 g PE/g catalyst. The melt flow index of the polymer, at 190° C. under 2.16 kg, is 2.0 g/10 minutes.

Example 13

0.3 ml of a 1.3M solution of tributylaluminum in heptane (0.4 mmol) and then 0.009 g of catalyst G (2.0 mg of catalyst D, 1.5 µmol of Zr) are introduced into a 500 ml two-necked round-bottomed flask comprising 300 ml of heptane. 0.002 g of N,N-dimethylaluminum tetra(pentafluorophenyl)borate (2.5 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 10 minutes, the reactor is degassed and the polymer is precipitated from a dilute solution of acidic methanol (MeOH/HCl). After filtering, washing with methanol and drying, 5.3 g of polyethylene are recovered, which corresponds to a productive output of 2 944 g PE/g catalyst D.

Example 14

0.2 ml of a 1.3M solution of tributylaluminum in heptane (0.3 mmol) and then 0.006 g of catalyst G (1.3 mg of catalyst D, 1.0 µmol of Zr) are introduced into a 500 ml two-necked round-bottomed flask comprising 300 ml of heptane. 0.004 g of N,N-dimethylaluminum tetra(pentafluorophenyl)borate (4.9 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 20 minutes, the reactor is degassed and the polymer is precipitated from a dilute solution of acidic methanol (MeOH/HCl). After filtering, washing with methanol and drying, 5.7 g of polyethylene are recovered, which corresponds to a productive output of 4 750 g PE/g catalyst D.

Example 15

0.1 ml of a 1.3M solution of tributylaluminum in heptane (0.2 mmol) and then 0.004 g of catalyst G (0.9 mg of catalyst D, 0.7 µmol of Zr) are introduced into a 500 ml two-necked round-bottomed flask comprising 300 ml of heptane. 0.006 g of N,N-dimethylaluminum tetra(pentafluorophenyl)borate (7.5 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 25 minutes, the reactor is degassed and the polymer is precipitated from a dilute solution of acidic methanol (MeOH/HCl). After filtering, washing with methanol and drying, 8.4 g of polyethylene are recovered, which corresponds to a productive output of 10 500 g PE/g catalyst D.

Example 16

0.2 ml of a 1.3M solution of tributylaluminum in heptane (0.3 mmol) and then 0.006 g of catalyst G (1.3 mg of catalyst D, 1.0 µmol of Zr) are introduced into a 500 ml two-necked round-bottomed flask comprising 300 ml of heptane. 0.014 g of N,N-dimethylaluminum tetra(pentafluorophenyl)borate (17.5 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 10 minutes, the reactor is degassed and the polymer is precipitated from a dilute solution of acidic methanol (MeOH/HCl). After filtering, washing with methanol and drying, 8.7 g of polyethylene are recovered, which corresponds to a productive output of 7 250 g PE/g catalyst D.

Example 17

0.011 g of catalyst D (7.2 µmol of Zr), 0.009 g of N,N-dimethylaluminum tetra(pentafluorophenyl)borate (11.2 µmol), 1.4 ml of a 1.3M solution of tributylaluminum in heptane (1.6 mmol) and 20 ml of toluene are successively introduced, at [lacuna] temperature, into a 50 ml round-bottomed flask comprising 2.772 g of HDPE (the HDPE was drawn under a dynamic vacuum at 200° C. for 2 hours before it is used). After stirring for 15 minutes, the solvent is evaporated under dynamic vacuum. The solid obtained is introduced under a stream of argon into a gas-phase reactor comprising 20 g of HDPE charge (the reactor and the charge were conditioned beforehand by a series of three times vacuum/argon at 80° C., then 1.2 ml of a 1.3M solution of tributylaluminum in heptane (1.6 mmol) were introduced before drawing the reactor under vacuum at 80° C.). 0.5 bar of butene is introduced before raising the pressure to 12 bar with ethylene and the temperature to 70° C. The total pressure of the reactor is held at 12 bar (by addition of ethylene) and the temperature at 70° C. during the polymerization. After polymerizing for 92 minutes, the reactor is degassed and 26.0 g of polyethylene (plus the 20 g of charge) are recovered, which corresponds to a productive output of 2 363 g PE/g catalyst D. The melt flow index of the polymer, at 190° C. under 21.6 kg, is 1.6 g/10 minutes.

Example 18

0.012 g of catalyst D (9.1 µmol of Zr), 0.030 g of N,N-dimethylaluminum tetra(pentafluorophenyl)borate (37.4 µmol), 1.5 ml of a 1.3M solution of tributylaluminum in heptane (2.0 mmol) and 20 ml of toluene are successively introduced, at [lacuna] temperature, into a 50 ml round-bottomed flask comprising 0.828 g of HDPE (the HDPE was drawn under a dynamic vacuum at 200° C. for 2 hours before it is used). After stirring for 15 minutes, the solvent is evaporated under dynamic vacuum. The solid obtained is introduced under a stream of argon into a gas-phase reactor comprising 20 g of HDPE charge (the reactor and the charge were conditioned beforehand by a series of three times vacuum/argon at 80° C., then 1.5 ml of a 1.3M solution of tributylaluminum in heptane (2.0 mmol) were introduced before drawing the reactor under vacuum at 80° C.). 0.5 bar of butene is introduced before raising the pressure to 12 bar with ethylene and the temperature to 70° C. The total pressure of the reactor is held at 12 bar (by addition of ethylene) and the temperature at 70° C. during the polymerization. After polymerizing for 56 minutes, the reactor is degassed and 43 g of polyethylene (plus the 20 g of charge) are recovered, which corresponds to a productive output of 3 583 g PE/g catalyst D.

Example 19

1 ml of a 0.9M solution of tributylaluminum in heptane (0.9 mmol) and then 0.014 g of catalyst E (i.e. 5.2 µmol of Zr) are introduced into a 500 ml two-necked round-bottomed flask comprising 300 ml of heptane. 0.012 g of N,N-dimethylaluminum tetra(pentafluorophenyl)borate (14.9 µmol) is subsequently introduced. The suspension thus obtained is introduced under a stream of argon into a 0.5 liter glass reactor. After having degassed the reactor, the pressure is raised to 4 bar absolute of ethylene and the temperature is raised to 80° C. The pressure and the temperature are kept constant during the polymerization. After polymerizing for 95 minutes, the reactor is degassed and the polymer is precipitated from a dilute solution of acidic methanol (MeOH/HCl). After filtering, washing with methanol and drying, 7.2 g of polyethylene are recovered, which corresponds to a productive output of 514 g PE/g catalyst E.

Example 20

0.6 ml of a 1.3M solution of tributylaluminum in heptane (0.8 mmol) and then 0.010 g of catalyst D (7.6 µmol of Zr) are introduced into a 500 ml two-necked round-bottomed flask comprising 250 ml of toluene. 0.014 g of N,N-dimethylaluminum tetra(pentafluorophenyl)borate (17.5 µmol) is subsequently introduced. The suspension thus obtained is introduced under a stream of argon into a 0.5 liter glass reactor. After having degassed the reactor, the pressure is raised to 4 bar absolute of propylene and the temperature is raised to 70° C. The pressure and the temperature are kept constant during the polymerization. After polymerizing for 15 hours, the reactor is degassed and the polymer is precipitated from a dilute solution of acidic methanol (MeOH/HCl). After filtering, washing with methanol and drying, 15 g of polypropylene are recovered, which corresponds to a productive output of 1 500 g PP/g catalyst E.

Atactic polypropylene; Mn 3 820 g/mol; Mw 5 930 (GPC in tetrahydrofuran at 45° C., polystyrene standards).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. A solid catalytic component comprising a metallocene, at least one first ligand of which comprises a cyclopentadienyl group chemically bonded to a linking group consisting of a —[C(R5,R6)]—group, the —[C(R5,R6)]—group being bonded directly to a support composed of a porous inorganic compound, wherein R5 and R6 are both methyl groups or both phenyl groups.

2. The catalytic component as claimed in claim 1, wherein the porous inorganic compound is a silica.

3. The catalytic component as claimed in claim 1, wherein the metallocene comprises a metal selected from titanium, vanadium, hafnium, zirconium and chromium.

4. The catalytic component as claimed in claim 1, wherein the metallocene comprises zirconium.

5. The catalytic component as claimed in claim 1, wherein the metallocene additionally comprises a second ligand.

6. The catalytic component as claimed in claim 5, wherein the second ligand comprises a cyclopentadiene group.

7. The catalytic component as claimed in claim 5, wherein the second ligand comprises a substituted or unsubstituted amide group or an alkoxide group.

8. The catalytic component as claimed in claim 5, wherein the first ligand and the second ligand are bonded to one another via a bridging group.

9. The catalytic component as claimed in claim 8, wherein the bridging group is a dimethylsilyl group.

10. A process for the suspension or gas-phase polymerization or copolymerization of at least one olefin in the presence of the component as claimed in claim 1.

11. A process for the preparation of a metallocene chemically bonded to a solid, which comprises:
(a) provision of a support comprising functional groups reacting with a fulvene compound to form a bond by a —[C(R5,R6)]—bridge;
(b) reaction with a fulvene compound according to the formula (1)

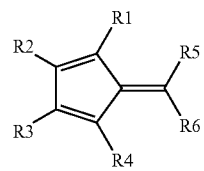

in which $R_1$ to $R_6$ is a hydrogen atom or identical or different $C_1$ to $C_{16}$ alkyl radicals, alkenyl radicals, aryl radicals, alkylaryl radicals or arylalkyl radicals, wherein the arylalkyl radicals can form at least one saturated or unsaturated rings;
(c) for the production of a cyclopentadienyl derivative bonded to the solid support by a —[C(R5,R6)]—bridge,
(d) reaction of the product obtained in stage (c) with a transition metal compound according to the formula $ML_x$, in which M is a transition metal selected from the elements from Groups 3, 4, 5, 6, ,7, 8, 9 and 10 of the Periodic Table of the Elements or the lanthanides, L is a halogen, a hydrogen, an alkyl, an aryl, an alkoxy or an amide, and x is an integer corresponding to the valency of the metal M.

12. The process as claimed in claim 11, which additionally comprises:
(e) reaction of the product from stage (d) with a compound according to the formula (4):

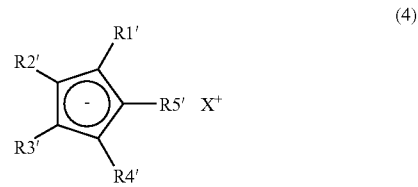

in which R1' to R5' represent a hydrogen atom or identical or different $C_1$ to $C_{16}$ alkyl groups, alkenyl groups, aryl groups, alkylaryl groups or arylalkyl groups, wherein the arylalkyl groups can form at least one saturated or unsaturated rings and X is an alkali metal.

13. The process as claimed in claim 11, which further comprises activation of the product from (d) or (e) with a cocatalyst.

14. The process as claimed in claim 13, wherein the cocatalyst is selected from methylaluminumoxane, the $B(C_6F_5)_3$/triisobutylaluminum or $[HNMe_2Ph][B(C_6F_5)_4]$/triisobutylaluminum systems.

15. The process as claimed in claim 11, wherein, before (c), the product from (b) is reacted with a compound carrying a bridging group and then the product thus obtained is subjected to deprotonation.

16. The process as claimed in claim 15, wherein the compound carrying a bridging group corresponds to the formula (6):

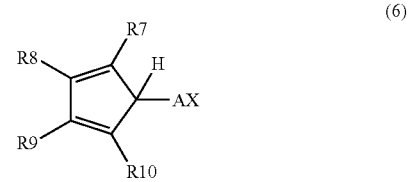

in which A is a difunctional group, X is a halogen and R7 to R10 represent a hydrogen atom or identical or different C1 to C16 alkyl groups, alkenyl groups, aryl groups, alkylaryl groups or arylalkyl groups, wherein the arylalkyl groups can form at least one saturated or unsaturated ring.

17. A solid catalytic component being obtained by the process of claim 11.

18. A process for the suspension or gas-phase polymerization or copolymerization of at least one olefin in the presence of the component as claimed in claim 17.

* * * * *